Feb. 21, 1956     J. J. GILVARRY ET AL     2,736,015
AUTOMOBILE PARKING AID
Filed Nov. 9, 1951                      3 Sheets-Sheet 2
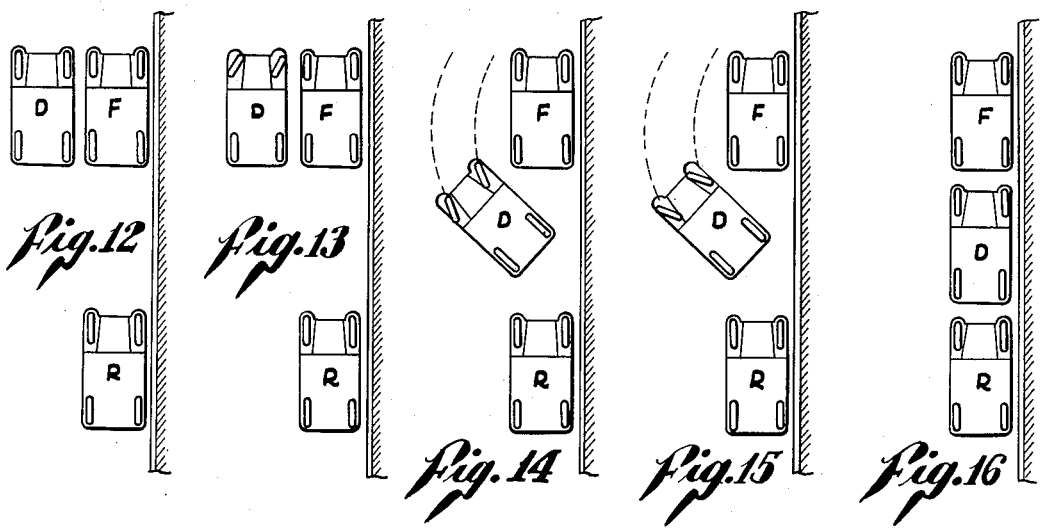
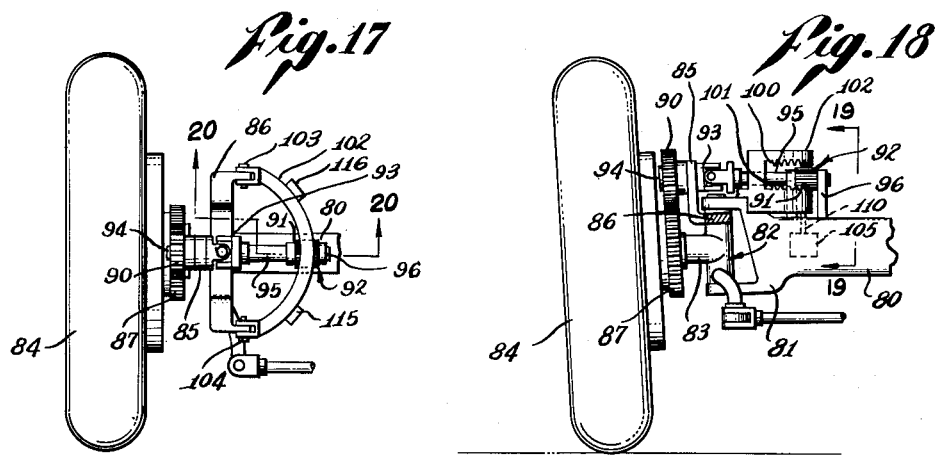
INVENTORS
JOHN J. GILVARRY
LINN A. GORE
BRUNO W. AUGENSTEIN
WILLIAM C. RANDELS
By Fulwider & Mattingly
Attorneys

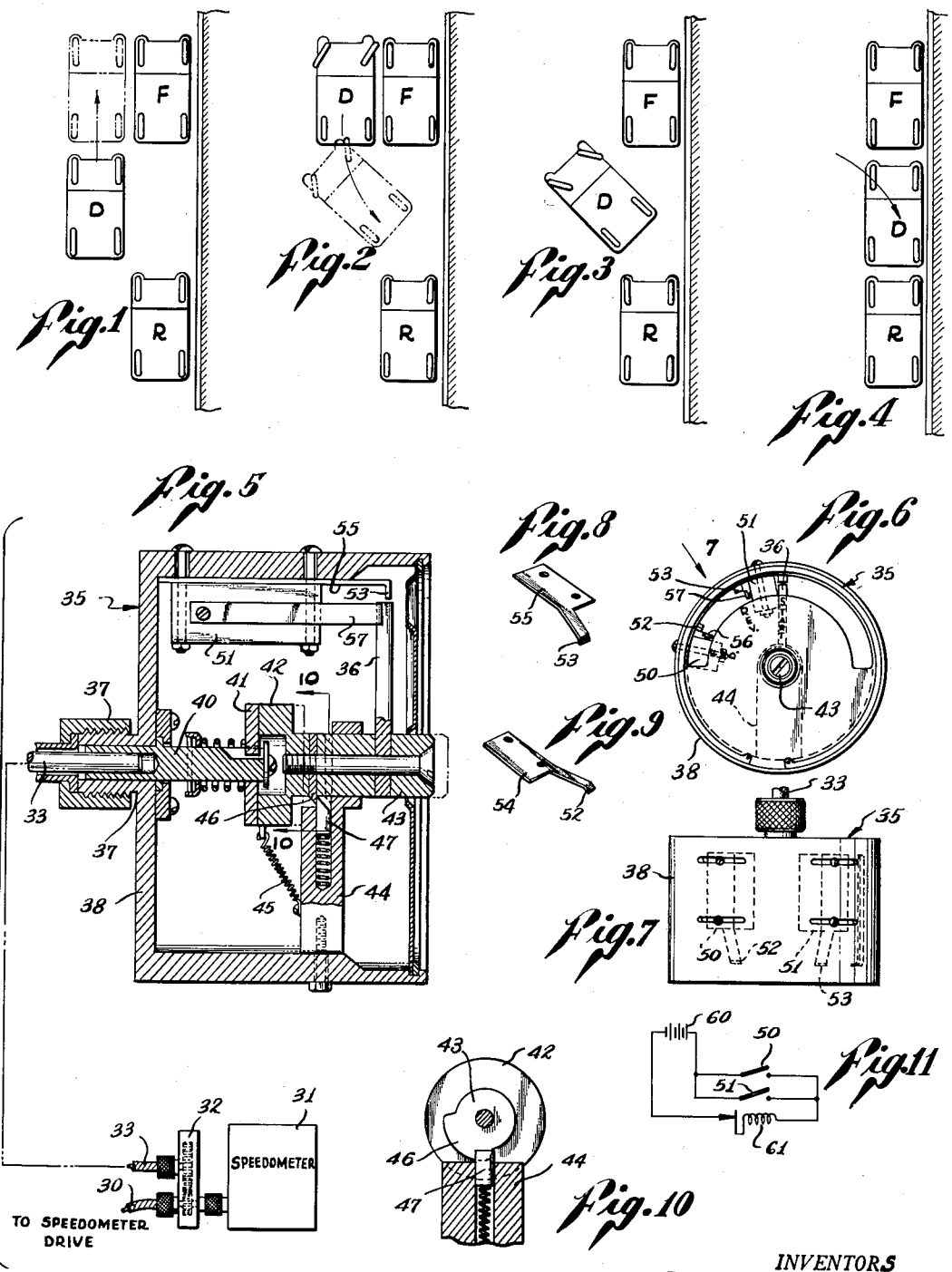

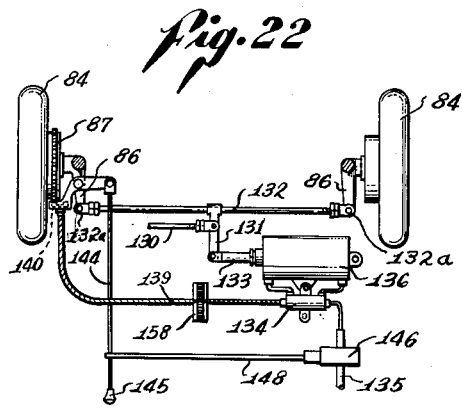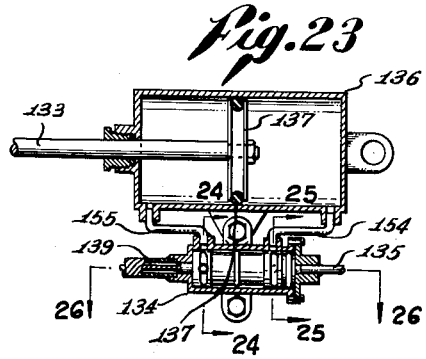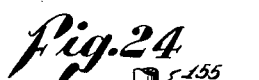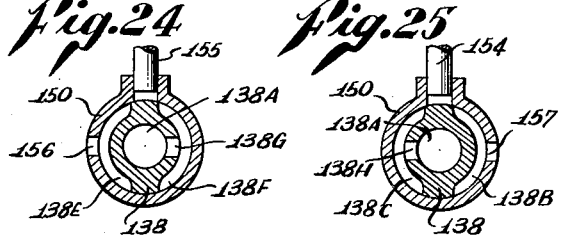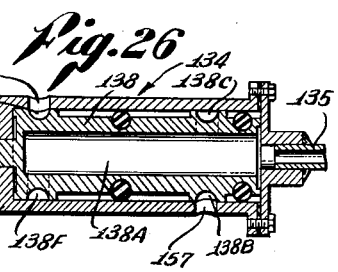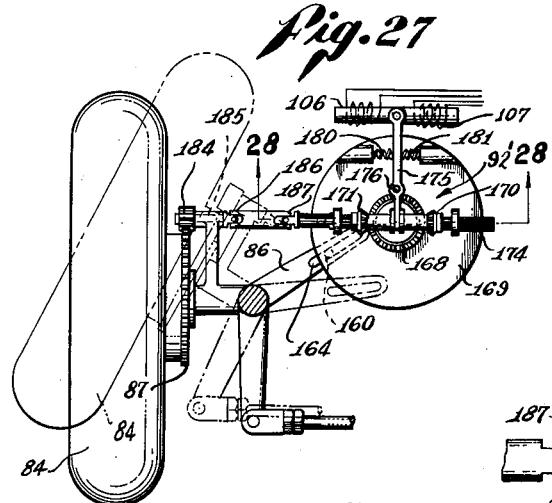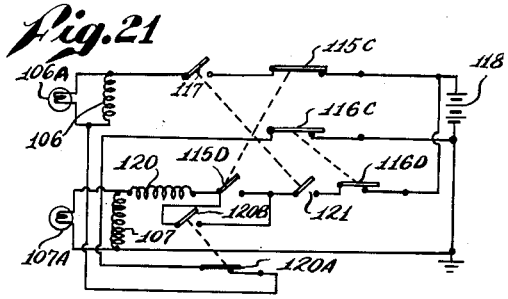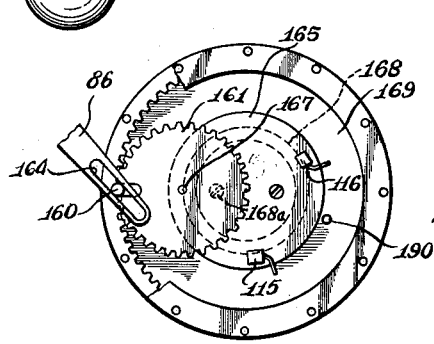

United States Patent Office 2,736,015
Patented Feb. 21, 1956

2,736,015

AUTOMOBILE PARKING AID

John J. Gilvarry, Los Angeles, Linn A. Gore and Bruno W. Augenstein, Santa Monica, and William C. Randels, Los Angeles, Calif., assignors to said Gilvarry and said Gore Application November 9, 1951, Serial No. 255,576

4 Claims. (Cl. 340—282)

Our invention relates generally to the parking of automotive vehicles, and more particularly to devices adapted to aid and facilitate the parking of such a vehicle in the shortest possible space, and with the least possible movement of the steering wheels.

This application is a continuation-in-part of our prior application Serial No. 182,476, filed August 31, 1950, and entitled "Parking Device," and which has since been abandoned.

The problem of parking an automobile adjacent the curb, and between two parked cars, particularly where so-called "parallel" parking is required, has always presented certain problems for the driver. Particularly in the case of the somewhat inexperienced operator, parallel parking has been quite difficult, and the problem has often assumed such proportions in the minds of these drivers that great efforts have been used to avoid the need for parallel parking. Actually, the problem is not difficult, but judgment and experience play very important parts in parking an automobile in the least possible space, with the fewest possible movements. Most drivers have known that pulling abreast of the car parked ahead of the parking space, turning the steering wheel to the right, backing, and then turning the steering wheel to the left when a predetermined position with respect to the forward car is reached, parking can quickly and easily be accomplished. The exact position for these various maneuvers, however, can only be determined by practice and experience, and many drivers never become adapt at this type of parking.

It is possible to establish a sequence of operations, such as those just described, that will permit the car to be parked in the least possible space. The sequence may be started at any desired point in the normal parking operations, and the movement of the car itself may be used to indicate when the various operations should be performed. In fact, it is possible to use this movement to perform these operations, so that the power of the engine is used to steer the car in a manner to follow a predetermined path.

While parking devices have previously been known, these in general have relied upon auxiliary means, such as wheels, that may be lowered from the car to engage the ground or street, and then to move the car in a direction generally perpendicular to its normal line of travel. Such devices, while theoretically practical, introduce many mechanical complications, and satisfactory devices of this type have been too expensive to be included in popularly priced cars. These same problems, and generally even greater complications arise if an attempt is made to include these devices in existing automobiles.

It is therefore a major object of our invention to provide a parking device that enables an automobile or similar vehicle to be parked in the shortest possible distance, and with the fewest possible movements.

It is another object of our invention to provide a parking device of this type that may be incorporated as a standard part and equipment of an automobile when built, or may equally well be installed upon existing automobiles.

A further object of our invention is to provide a parking device that, in one form, will provide signals indicating when an operation is to be manually performed, and in other forms provides an indication and also performs the operation by means of some suitable type of servo-mechanism powered by the engine of the car.

Still another object of our invention is to provide a parking device of this character that is very simply operated and requires the minimum of judgment and experience on the part of the operator, so that even a novice may quickly and easily park an automobile.

It is a still further object of our invention to provide such a parking device that, while being rugged, is simple and inexpensive to manufacture and install, while having great dependability.

These and other objects and advantages of our invention will become apparent from the following description of various forms thereof and from the drawings illustrating those forms, in which:

Figs. 1, 2, 3 and 4 are diagrammatic illustrations of the steps involved in parking an automobile, using a manually-powered, visually indicating form of our device;

Fig. 5 is a cross-sectional view through the visual indicator of the manually operable form of our device, with the necessary mechanical connections to the odometer drive indicated;

Fig. 6 is a front elevational view of the indicator shown in Fig. 5, as it appears to the operator when installed upon the instrument panel or other convenient mounting;

Fig. 7 is a view taken in the direction of the arrow 7 in Fig. 6, showing the exterior of the case of the visual indicator, and the method of mounting the switches for adjustment in this indicator;

Fig. 8 is a perspective view of one of the indicator markers used in the visual indicator shown in Figs. 5, 6 and 7;

Fig. 9 is a perspective view of another indicator member used therein;

Fig. 10 is a cross-sectional view taken on the line 10—10 of Fig. 5, indicating the locking collar used in the operation of our device;

Fig. 11 is a schematic wiring diagram showing the electrical connections used with our visual indicator;

Figs. 12 through 16 are a series of schematic diagrams illustrating the steps in parking an automobile, when a slightly different sequence of operations is used, such as might be followed when using one of the power or servo-operated forms of our device;

Fig. 17 is a top plan view of a ground-engaging steerable wheel, hereinafter referred to as a "dirigible wheel," of an automobile showing one species of a power-operated parking device operatively connected thereto, the particular dirigible wheel shown being the left front wheel of a vehicle;

Fig. 18 is a rear elevational view of the dirigible wheel and associated mechanism shown in Fig. 17;

Fig. 19 is an elevational view taken on the line 19—19 of Fig. 18, showing the power connection for turning the dirigible wheel;

Fig. 20 is a view on an enlarged scale, taken on the line 20—20 of Fig. 17 and showing some of the parts in section;

Fig. 21 is a schematic wiring diagram of the control circuit used to operate the various elements associated with the first species of the power-operated devices;

Figs. 22 through 26, inclusive, illustrate a hydraulically or pneumatically powered mechanism that constitutes a second power-operated species of our device, Fig. 22 being a top plan view of a schematic representation of the complete system, Fig. 23 showing the power operating cylinder and valve in section, and Figs. 24, 25 and 26 being sectional views taken on lines 24—24, 25—25 and 26—26 of Fig. 23;

Figs. 27, 28 and 29, inclusive, illustrate a third species of power-operated forms of our parking device, this third species being a mechanically operated form shown generally in plan view in Fig. 27, while Fig. 28 is a sectional view taken on the line 28—28 of Fig. 27, and Fig. 29 is a bottom plan view taken on the line 29—29 of Fig. 28.

Referring now to the drawings, and particularly to Figs. 1 through 4 thereof, we have illustrated one sequence of operations that may be used in the parallel parking of an automobile. In this sequence, the driver of a car D locates a parking space between a parked car F and a second parked car R in the front and rear of that space, respectively. The space, it is assumed, is of sufficient length to receive the car D, with sufficient additional length to provide the necessary maneuvering space required in any parallel parking operation. In this particular parking sequence, the driver of the car D pulls abreast of the parking space and parallel to it, and then starts the prescribed sequence. The first step of the sequence is that of moving the car D directly forward, in a straight line, to a point generally but not necessarily aligned with the forward parked car F. This forward movement of the car D is for a certain predetermined distance, and at the completion of this step, the car D is in the position indicated in phantom outline in Fig. 1.

At that time, the driver of the car D then turns his wheels to the extreme right, as illustrated in Fig. 2, and places the car in reverse and backs to the position indicated in phantom outline in Fig. 2. This second step likewise requires a certain predetermined movement of the car D. This extreme right position of the dirigible wheels is also hereinafter referred to as the "inward" position, since the car is then moved into the parking space.

At the end of step two, the driver of car D turns his wheels from their extreme right position, to their extreme left position, sometimes hereinafter referred to as the "outward" position, as illustrated in Fig. 3, and then continues in reverse until substantially parallel to the curb and within the parking space, as illustrated in Fig. 4. Thus, at the end of this third step, the parking operation is substantially completed, and only slight additional maneuvering may be necessary. It will be apparent, of course, that with appropriate modification, the parking sequence can be started when the car D is abreast of the rear car R, or abreast of the forward car F. However, regardless of where the sequence is started, the essential steps of the sequence remain the same.

Likewise, in order to know when the various steps should be started, it is necessary that the distance the car travels be accurately measured. While this can be done by means of a fifth wheel, we have found it considerably simpler and equally effective to use one of the four customary wheels as the measuring device, and in the various forms illustrated herein, we make use of both the rear wheels and the front wheels as the measuring wheels. One of the simplest methods, of course, is to make use of the speedometer drive, which in most cars is connected to the drive shaft and, hence, uses the rear wheels as a means for measuring the distance traveled. The use of the speedometer drive is particularly convenient, since the speedometer is usually mounted on the instrument panel very near the indicating member of the parking device.

A simple form of parking device making use of the speedometer drive and intended to provide only an indication as to when the operator is to manually turn the wheels, is shown in Fig. 5. In this form of our device, the normal operating functions of the speedometer are not changed or modified in any manner, and it provides its usual functions of indicating both speed and distance traveled. To connect our parking indicator, the flexible shaft 30 that drives the speedometer 31 is disconnected from the latter and an auxiliary coupling 32 is connected to the speedometer and the flexible shaft in turn is connected to the coupling. The coupling 32 also has an additional connection for a flexible shaft 33, and the latter is driven by suitable means, such as gears within the coupling 32, so that the speed of the flexible shaft 33, while not necessarily being the same as that of the flexible shaft 30, at least corresponds thereto.

At its other end, the flexible shaft 33 is connected to an indicating device 35 having a rotatable pointer 36 that may be driven by the shaft 33. As the pointer 36 is rotated, it indicates the distance the vehicle has traveled, and at appropriate times, switches may be closed to provide an audible indication that one of the steps of the sequence is complete, and it is time to start the next step.

Fundamentally, the indicator 35 consists of a housing 38 having coupling means 37 adapted to receive the flexible shaft 33 and transmit the rotational power therefrom through the rear wall of the housing 38. A shaft 40 forms a part of the coupling 37, and projects toward the front of the housing 38, preferably being located in the center thereof. At its forward end, the shaft 40 carries a clutch plate 41, and a cooperating driven clutch plate 42 is carried by a shaft 43 that projects through the front of the housing 35, and is supported by a bearing post 44. The rotatable indicating arm 36 is connected to the shaft 43 for movement therewith, and the entire shaft assembly, including the driven clutch plate 42, the shaft 43, and the indicating arm 36, is axially movable from a normal position, indicated in phantom outline, where the driven clutch plate 42 is disengaged from the clutch plate 41, to an operating position, indicated in solid outline, where the clutch plates are engaged.

A centering spring 45 is attached to the bearing post 44 and to an extension connected to the driven clutch plate 42 so that the driven clutch plate and the driven shaft 43 are normally urged forwardly, and are also urged to a predetermined rest or central position, preferably with the indicator arm 36 vertical. A segmental collar or shoulder 46 is incorporated in the shaft 43, and a spring-pressed plunger 47 is mounted in the bearing post 44 to act as a detent when the shaft is pushed inwardly so that the clutch plates 41 and 42 are engaged. To prevent undue rotation of the shaft 43, the collar 46 extends only part way around the shaft 43, and when the shaft is rotated something less than one revolution, the collar is released from the plunger 47 so that the shaft 43 returns to its normal disengaged position.

Mounted within the housing 35 are a pair of miniature switches 50 and 51 having operating levers 56 and 57 that project into the path of the indicator arm 36. These switches are for indicating the end of one of the steps of the sequence, and since different cars will have different steering characteristics, the switches are mounted so that their position may be adjusted to meet the requirements of each individual car. In addition, each of the switches 50 and 51 carries a visual indicator or flag 52 and 53, respectively, that is aligned with the indicator arm 36 at the end of the particular step of the sequence. Since, as previously mentioned, the switches 50 and 51 must be adjusted to meet the requirements of the particular car involved, the flags 52 and 53 must be correspondingly adjusted. To simplify this operation, we provide thin sheet members 54 and 55, carrying the flags 52 and 53, respectively, and mount the sheet members between the switches 50 and 51, respectively, and the housing 38, securing all in place by screws. The shape of the sheet members 54 and 55 is indicated in Figs. 8 and 9.

Each of the switches 50 and 51 is provided with an operating lever 56 and 57, respectively, and as indicated above and seen in Fig. 5, these levers project into the path of the indicating arm 36 for engagement by the latter as the shaft 43 rotates. The operating levers 56 and 57 are preferably formed of resilient material so that each of the operating members is, in effect, a leaf spring. In this way, the indicating arm 36 can travel past the latter in either direction without danger of breaking the indicating arm, the operating arm or lever, or the associated switch. The miniature switches we prefer to use for the switches 50 and 51 are operated by pressure on a small button or pin that projects from the case of the switch. The operating arm or lever of the switch bears against this pin and forces it inwardly to close the switch when the arm is pressed in one direction. When the arm is urged in the opposite direction, no pressure is applied to the pin, and consequently the switch remains open.

Thus, as the indicating arm 36 moves counterclockwise from the position shown in Fig. 6, it first encounters the switch operator 57 of the switch 51, and moves that operator away from the switch so that the electrical circuit controlled thereby is not completed. Thereafter, the indicating arm 36 bears against the switch operator 56 of the switch 50, pressing the operating arm or lever against its associated operating pin to cause the switch to complete its circuit. Should the indicating arm 36 be moved beyond this switch-closing position, the operating arm or lever 56 is flexed, permitting the continued movement of the indicating arm 36, and in extreme conditions, permitting the indicating arm to pass completely beyond the operating arm or lever without breakage or damage of the latter or other associated equipment. Thereafter, movement of the indicating arm 36 in a clockwise direction will move it away from the operating arm or lever 56 or, if the indicating arm has passed the operating arm or lever, will flex the operating arm or lever away from the switch 50 without again completing the circuit controlled by that switch. Continued clockwise movement of the indicating arm 36 will cause it to bear against the operating arm or lever 57 of the switch 51 in a manner to close the circuit controlled by that switch.

In Fig. 11, we have indicated a schematic wiring diagram of a circuit that may be used in conjunction with this particular form of our parking device. In this diagram, the numeral 60 indicates a battery, such as the usual automotive battery, and the numeral 61 indicates generally a buzzer or other suitable audible warning device. The switches 50 and 51 are connected in parallel with each other and in series with the circuit including the battery 60 and the buzzer 61 so that when either of these switches is closed, the buzzer is operated. While a visual indicating device might be employed instead of an audible warning signal, the latter is generally to be preferred since the operator of the vehicle normally is busy observing the progress of the parking operation.

It is believed that the operation of this particular form of our parking device will now be apparent. When the driver of the car D finds a parking space, he pulls abreast of this space, to the position indicated in Fig. 1, and then presses inwardly on the end of the shaft 43 which projects through the face of the indicator 35. The centering spring 45 has insured that the indicator arm 36 is properly centered or indexed, and it is thus in the proper position for the start of the parking sequence. The operator then drives the car D forwardly, and the movement of the car causes the flexible shaft 33 to turn the shaft 40, the clutch plates 41 and 42, and the shaft 43 so that the indicating arm 36 is rotated in the counterclockwise direction.

The indicator arm moves past the operating arm or lever 57 of the switch 51 without causing completion of the circuit controlled by that switch, and then bears against the operating arm or lever 56 of the switch 50 to close that switch and cause the buzzer 61 to give an audible sound. At that time, the operator stops the car, turns the wheels all the way to the right, and then backs the car, as indicated in Fig. 2 of the drawings. During the backing operation of the car, the flexible shaft 33 is driven in the opposite direction, and consequently the indicator arm 36 moves in a clockwise direction, toward its original starting point. When the car D reaches the position shown in Fig. 3 of the drawings, the indicating arm 36 is in position to bear against the operating arm or lever 57 of the switch 51 to cause the completion of its circuit, and again sound the buzzer 61. At that time, the driver turns the wheels from their prior position of extreme right to extreme left, and then continues backing the car, until the position shown in Fig. 4 is reached. Any minor maneuvering that is then necessary is not controlled by the operation of our parking device.

When the shaft 43 is pushed inwardly to start the operation of the parking device, the segmental collar 46 is engaged by the spring-pressed plunger 47 to retain the shaft in its inner position, with the clutch plates 41 and 42 engaged. The shaft 43 remains in its inner position, and the clutch plates 41 and 42 remain engaged during the entire parking sequence just described. However, when the car is to be removed from its parking place and driven away, the forward movement of the car causes the rotation of the flexible shaft 33 and consequently of the shaft 40, and as a result the shaft 43 is rotated in a counterclockwise direction until such time as the segmental collar 46 is turned to a position where it no longer engages the spring-pressed plunger 47. The shaft 43 is then returned to its normal or outer position by the action of the centering spring 45, which also rotates the shaft about its axis until the indicator arm 36 is in its normal or rest position.

*Description of Figs. 17 through 21*

While the parking device just described greatly simplifies the problem of parallel parking of vehicles, it will be appreciated that the turning of the dirigible wheels must be accomplished by the driver or operator himself, and the effort required for this may be considerable. To secure the maximum benefit from our parking device, the wheels must be turned sharply when the car is at a predetermined position, and it is generally recognized that it is much more difficult to turn the wheels when the car is stationary than when it is moving. While the car can be moved while the turning operation is being performed, unless the movement of the car and the turning of the wheels are done at a standardized rate, the parking operation will not be uniform. Thus, to reduce the physical effort required in parking, and also to insure a standard, uniform procedure, a power-operated parking apparatus is to be preferred. In Figs. 12 through 16 we have illustrated the steps in a parking sequence using such a power-operated device, and it will be recognized that this sequence is essentially the same as that previously illustrated in Figs. 1 through 4.

However, as previously mentioned, the start of the parking sequence need not take place when the driver of the car pulls abreast of the parking space, but instead it may begin when the driver has pulled abreast of the forward parked car F. This initial condition is indicated in Fig. 12, and thereafter, the dirigible wheels are turned inwardly to the right, as indicated in Fig. 13. From that point, the sequence is the same as that previously described, but with the actual turning of the wheels being accomplished by the engine of the car acting through the movement of the car, or acting through auxiliary power means such as a fluid pump, an air compressor, or other suitable servomechanisms. In this connection, it should be noted that the position of the dirigible wheels indicated in Figs. 12 through 16 are not strictly accurate for the various forms of device hereinafter described, except for the hydraulically or pneumatically operated form illustrated in Figs. 22 through 26. It will be appreciated, of course, that other forms of quick-operating mechanisms other than fluid motor drives may be used to provide the complete and rapid turning of the dirigible wheels.

In each of the three power-operated species shown herein the mechanism may be mounted on the automobile frame member 80 of standard construction which terminates at its ends in a yoke structure 81 that is adapted to support the conventional kingpin bearing structure 82. The kingpin bearing structure 82 supports the wheel axle 83 upon which is rotatably mounted one of the dirigible wheels 84. The wheel axle 83 is rigidly connected to an arm 86 which is used, as hereinafter explained, to move the dirigible wheel 84 to different oriented positions with any one of the three different mechanisms described. It is noted that the element 86 has different shapes in the three different structures, but its function in each instance is the same; namely, to impart pivotal movement to the steering wheel from the corresponding mechanisms. Further, each of the three mechanisms described herein invloves the use of a driving gear 87 mounted on the dirigible wheel 84 to rotate with the same.

Referring specifically to the species of our invention illustrated in Figs. 17 through 21, inclusive, the gear 87 is in constant mesh with a pinion 90 which is coupled to constantly drive a driving gear 91 of a normally disengaged motion reversing clutch 92, through a universal joint 93. Specifically, the pinion 90 is fixedly secured to the shaft 94 which terminates as one part of the universal joint 93, and which is journaled for rotation in an arm 85, the other part of the universal joint being attached to a shaft 95 on which is mounted the driving gear 91. The shaft 95 is journaled for rotation in a bracket 96 which is affixed to the frame member 80.

This gear 91 normally constantly rotates between two arcuate-shaped rack-type gears 100 and 101 disposed on the inner adjacent faces of an arcuate member 102 which is pivotally mounted by means of hinges 103 and 104 on the arms 86.

Either one of the arcuate-shaped, rack-type gears 100 and 101 may be meshed with the constantly rotating driving gear 91 upon energizing a solenoid means 105 (Figs. 18 and 19), which includes coils 106 and 107 (Fig. 21). Such meshing will drive the arcuate member 102 either to the right or left in Fig. 18 to, in turn, correspondingly move the wheel 84 outwardly or inwardly. The movement of the arcuate member 102 into or out of engagement with the driving gear 91 is produced by the solenoid means 105 which has a plunger 110 whose upper end carries a roller 111 adapted to ride in a transversely extending guide groove 112 in the member 102. This plunger 110 is normally held in a mid-position by a pair of prestressed coil compression springs 113 and 114 that thus serve to maintain the driving gear 91 out of engagement with the rack-type gears 100 and 101.

When the coil 106 of the solenoid or electromagnetic means 105 is energized, the gear 91 meshes with the gear 100, and when the other coil 107 is energized, gear 91 engages the gear 101. A circuit for accomplishing this energization is shown in Fig. 21, where the various switches are in the position they occupy when the wheels 84 are in the straight position, and the manually controlled switches have not been actuated to place the parking device in operation. It will be noted that this circuit includes limit switch assemblies 115 and 116 which are mounted on the arcuate member 102 with corresponding switch actuating members movable into engagement with the roller 111.

Thus, when the dirigible wheel 84 is moved to its inward position, the actuating member of switch assembly 115 is engaged and the associated switches 115C and 115D are actuated. It is noted that switch 115C is normally closed, and switch 115D is normally open, except when the actuating member of switch assembly 115 is engaged. Similarly, upon movement of the wheel 84 to its outward position to engage the actuating member of switch assembly 116, the normally closed switches 116C and 116D are actuated and these switches and the circuits controlled thereby are opened.

The coil 106 is connected in series with a manually operated switch 117, the limit switch 115C, a voltage source 118, the limit switch 116C and a switch 120A. The switch 120A is normally closed and is a portion of a current relay which has an operating coil 120 that, when energized, opens the switch 120A. The other or "out" coil 107 of the solenoid means 105 is connected in series with the winding 120 of the current relay, the limit switch 115C, a manually operated switch 121, the limit switch 116D and the voltage source 118. It will be noted that a normally open switch 120B, which is actuated upon current flow through the winding 120, is in parallel with the switch 115D so that a "holding" circuit for the current relay is established. The manually operated switches 117 and 121 may be ganged for convenience in operation and preferably are located in a conveniently accessible position on the dashboard of the automobile.

The operation of the apparatus shown in Figs. 17 through 21, inclusive, is quite simple. When the automobile is positioned as shown in Fig. 12, the manually operated switches 117 and 121 are closed, the driver places his car in conventional reverse gear, lets out the clutch and the mechanism automatically controls the steering of the car. Closure of switch 117 results in energizing the winding 106 to place the gears 91 and 100 in mesh. When and as the car moves backward, the arcuate member 102 attached to the arm 86 causes the wheel axle 83 gradually to pivot. When the car assumes the position shown in Fig. 14, the switch assembly 115 is actuated to cause the switch 115C to open and the switch 115D to close, thereby deenergizing the coil 106 and causing energization of the coil 107, it being remembered that the manually operated switch 121 is in a closed position.

Such energization of the coil 107 causes gear 91 to mesh with the arcuate-shaped gear 101. Thereafter, continued backward movement of the automobile results in movement of the arcuate member 102 to the left. During such movement to the left, the coil 107 remains energized, since the switch 115D is shunted by the switch 120B which is now closed as a result of current flowing through the winding 120 of the current relay. Thus, during such movement of the member 102 to the left, the front wheels are gradually moved from approximately the position shown in Fig. 14 corresponding to the "in" position, to the "out" position. When the wheels reach their "out" position, the car is nearly adjacent the curb and the switch assembly 116 is actuated to open the switches 116C and 116D, thereby deenergizing both coils 106 and 107 to allow the driving gear 91 to assume its normal disengaged position. At this stage the driver may open the manually operated switches 117 and 121 and proceed in normal manner to exactly position the car with respect to the curb and with respect to adjacent cars.

If desired, signalling means 106A and 107A (Fig. 21), such as lights or buzzers, may be connected in parallel with the coils 106 and 107, respectively, to signal the driver. Such signalling means 106A and 107A are here shown as lamp bulbs and may be mounted in some convenient place such as on the dashboard of the car. Thus, the lamp bulb 106A is energized and glows when the coil 106 is energized, thereby signalling to the operator that he is in the first phase or step of the parking operation. When the first phase is completed, the lamp bulb 106A is deenergized and the other lamp bulb 107A is energized and glows to signal to the operator that he is in the second phase of the parking operation. When the second phase has been completed neither the bulb 106A nor the bulb 107A glows, and the operator is thereby informed of the completion of the parking operation. The operator then has a positive indication as to when he should open the manually operated switches 117 and 121 and resume parking maneuvers, if necessary or desirable without the further aid of the new means provided herein.

It is noted that while this mechanism is being operated the steering wheel is turned thereby and the driver is free to use his steering wheel to aid in pivoting the wheel axle 83.

*Description of Figs. 22 through 26*

In the arrangement shown in Figs. 22 through 26, inclusive, pneumatic means are provided for accomplishing the above indicated results. Steering of the automobile is accomplished in conventional manner by movement of a link 130 attached by suitable means (not shown) to the steering wheel of the automobile. This link is pivotally mounted at an intermediate point on an arm 131, which has one of its ends attached to a synchronizing rod 132 and its other end pivotally connected to a plunger rod 133. Opposite ends of the link 132 are pivoted to the arms 86 at points 132a. Movement of the plunger rod 133 is controlled by a rotary-type valve 134, which serves to control the flow of fluid from a high pressure line 135 into a cylinder 136 in which a double-acting piston 137 is free to move. Within the valve 134 is a rotary control element 138 that is driven by a flexible cable shaft 139 having a small gear 140 at its other end which is movable into engagement with the driving gear 87. This gear 140 is normally out of engagement with the gear 87 but is movable into engagement therewith by movement of a manually operable rod 144. The free end of this rod 144 carries a handle 145 in a conveniently accessible position for the driver of the automobile. Movement of this handle 145 downwardly in Fig. 22 to cause engagement of the gear 140 with the gear 87 results also in opening a normally closed valve 146 disposed in the high pressure line 135. For this purpose, a link 148 extends between the rod 144 and the valve 146 to control the operation of the latter.

The rotary valve 134 includes a cylindrical housing 150, within which is rotatably mounted a rotary valve body 138. The rotary element 138 has a cylindrical central opening 138A which is constantly in communication with the high pressure air duct 135 and is recessed peripherally to provide a pair of annular spaces 138B and 138C (Fig. 25) adjacent a conduit 154, and similarly is recessed adjacent another conduit 155 (Figs. 23 and 24) to provide the annular recesses 138E and 138F. It is noted in Figs. 24 and 25 that the annular spaces 138F and 138C communicate with the central opening 138A through corresponding radial bores 138G and 138H, and the annular spaces 138E and 138B are vented to the atmosphere through openings 156 and 157 in the cylinder 150.

It is thus apparent from a study of Figs. 24 and 25, that slight counterclockwise movement of the valve body 138 from its normal position shown in those figures causes the piston 137 to be moved to the right in Fig. 23. Similarly, slight clockwise movement of the valve body 138 from its normal position results in the piston 137 being moved to the left. This movement of the piston 137, either to the right or left, as the case may be, causes a corresponding outward and inward movement of the dirigible wheels 84. It is noted that the position of the valve element 138 in Figs. 24 and 25 corresponds substantially to the position of the automobile shown in Figs. 14 and 15, wherein slight clockwise or counterclockwise movement of the valve body 138 results in orientation of the front wheels as shown in Fig. 14 or Fig. 15, as the case may be.

In operation of the arrangement shown in Figs. 22 through 26, the driver positions his automobile D as shown in Fig. 12 and then pulls the handle 145 (Fig. 22) to engage the gears 87 and 140. Such initial movement of the handle 145 results in opening of the valve 146 to introduce high pressure fluid, such as air, into the interior 138A of the valve body 138. At this stage the valve body 138 is in a position wherein such fluid under high pressure acts against the right-hand side of the piston 137 to move the dirigible wheels inwardly to the position shown in Fig. 13. To assure such initial positioning of the valve body 138, a torque spring 158 acts on the cable 139 to normally bias the valve body 138 to such predetermined position.

After the positioning shown in Fig. 13 is thus established, the automobile is placed in reverse gear and allowed to travel backwardly along the path indicated in Fig. 14. When the automobile assumes the position shown in Fig. 14, the valve body 138 is in the position shown in Figs. 24 and 25, the valve body being moved during such time by the rotation imparted to cable 139 from the driving gear 87. Further backward movement from the position shown in Fig. 14 results in reversal of fluid flow to the piston 137, with the result that the front wheels assume the position shown in Fig. 15. Thereafter, the automobile is allowed to move further backwardly to a position adjacent the curb, the gear 140 is disengaged upon manipulation of the handle 145, which simultaneously causes the valve 146 to close, and then the automobile may be maneuvered to a more favorable parking position, if desired, using the conventional controls.

*Description of Figs. 27 through 29*

The arrangement shown in Figs. 27, 28 and 29 is similar to the arrangement shown in Figs. 17 through 21, in that the mechanism is essentially mechanical. In this instance, however, the motion-reversing clutch 92' takes a form different from the clutch 92 of the previously described form, and the arm 86 has a different type of motion imparted thereto by a pin 160 on a gear 161 and traveling in a longitudinally extending slot 164 in the arm 86. The gear 161 is rotatably mounted on a plate 165 by a shaft 167, the plate in turn being affixed to a reversible ring gear 168 as by a bolt 168a. This ring gear 168 is rotatably mounted for guided movement on a stationary support 169 that is suitably recessed to accommodate the plate 165.

This ring gear 168 may be driven either in a clockwise or a counterclockwise direction by engagement with one of a pair of the bevel gears 170 and 171. Both of these gears 170 and 171 are mounted on a sleeve 172 carried by a splined shaft 174, and having a pair of spaced flanges on its outer surface adapted to receive one end of a fork 175 that is pivoted on a shaft 176, the other end of the fork 175 being biased to disengaged position by the pair of springs 180 and 181. The splined shaft 174 is driven by the driving gear 87, a constantly meshing pinion 184, shaft 185 and universal joint connections 186 and 187.

Thus, the shaft 174 constantly rotates, and its motion may be transferred to the arm 86 upon actuation of the clutch 92, which includes as elements thereof the bevel gears 170 and 171. This clutch 92 is actuated by electrical means that may be identical with those described in connection with Fig. 19, and for that reason corresponding parts in Figs. 19, 21, 27, 28 and 29 have identical reference numerals. In this case, however, the miniature switches 115 and 116, as shown in Fig. 29, are mounted for movement with the circular plate 165, so that their corresponding actuating members may be moved by engagement with a fixed pin 190, to cause actuation of such switches and operation of the control circuits which include the coils 106 and 107 in Fig. 27, and which control circuit is identical with the control circuit previously described in connection with Fig. 21.

Thus, the operation of the arrangement shown in Figs. 27, 28 and 29 is essentially the same as that described in detail in connection with Figs. 17 to 21, inclusive, with the exceptions noted above.

In each of the various forms of the parking device herein shown and described, it will be noted that one of the principal characteristics of the apparatus is its ability to measure the distance traveled by the car being parked, as by counting revolutions, and fractions thereof, of one or more of the ground-engaging wheels of the car. The mechanical result of this measurement is then used to operate a control or indicating means such as a buzzer, solenoid, etc., calling for the movement of the dirigible wheels in a predetermined sequence.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A parking device of the type described, intended for attachment to a wheeled vehicle having at least one dirigible wheel, and including: rotatable means connectible to at least one of the ground-engaging wheels of said vehicle for rotation thereby; manually operable means effective to connect said rotatable means to said ground-engaging wheel for a portion of one revolution of said rotatable means, thereafter automatically disconnecting the two; indicating means including electric switch assemblies, one of said assemblies being operable to provide a signal calling for the turning of said dirigible wheel to an inward position, and another of said assemblies being operable to provide a signal calling for the turning of said dirigible wheel to an outward position; and control means connected to and driven by said rotatable member and moved thereby to operatively engage said one of said switch assemblies to first provide an inward signal, and after said vehicle has moved a predetermined distance, to engage said other of said switch assemblies to provide an outward signal.

2. A parking device of the type described, intended for attachment to a wheeled vehicle having at least one dirigible wheel, and including: rotatable means connectible to at least one of the ground-engaging wheels of said vehicle for rotation thereby; manually operable means effective to connect said rotatable means to said ground-engaging wheel for only a portion of one revolution of said rotatable means, thereafter automatically disconnecting the two; indicating means including visible indicia and separate electric switch assemblies associated therewith, one of said indicia and the switch assembly associated therewith being operable to provide a signal calling for the turning of said dirigible wheel to an inward position, and another of said indicia and the switch assembly associated therewith being operable to provide a signal calling for the turning of said dirigible wheel to an outward position; and a control and indicator arm connected to and driven by said rotatable member and moved thereby to align with said one of said indicia and to operate said switch assembly associated therewith to provide an inward signal, and thereafter, upon movement of said vehicle a predetermined distance, to align with said other of said indicia and to operate said switch assembly associated therewith to provide an outward signal.

3. A parking device of the type described, intended for attachment to a wheeled vehicle having at least one dirigible wheel, and including: drive means connected to at least one of the ground-engaging wheels of said vehicle for rotation thereby; a rotatable shaft; manually operable clutch means for connecting said drive means to said shaft for only a portion of one revolution; indicating means including visible indicia and electric switch assemblies associated therewith but independent of said visible indicia, one of said indicia and the switch assembly associated therewith being operable to provide a signal calling for the turning of said dirigible wheel to an inward position, and another of said indicia and the switch assembly associated therewith being operable to provide a signal calling for the turning of said dirigible wheel to an outward position; and a control and indicator arm mounted on said shaft for rotation therewith and moved thereby to align with said one of said indicia and to operate said switch assembly associated therewith to provide an inward signal, and thereafter, upon movement of said vehicle a predetermined distance, to align with said other of said indicia and to operate said switch assembly associated therewith to provide an outward signal.

4. A parking device as defined in claim 3 in which said clutch means includes a segmental collar and a detent co-operating therewith to retain said clutch in engaged condition after manual engagement thereof, until said shaft completes less than one complete revolution, said collar thereafter being rotated to disengage said detent and thereby release said clutch.

References Cited in the file of this patent

UNITED STATES PATENTS

| | | |
|---|---|---|
| 2,459,202 | Thorson | Jan. 18, 1949 |
| 2,492,531 | Lee | Dec. 27, 1949 |